United States Patent [19]

Ishii et al.

[11] Patent Number: 4,849,931
[45] Date of Patent: Jul. 18, 1989

[54] DATA PROCESSING SYSTEM HAVING INTERFACING CIRCUITS ASSIGNED TO A COMMON I/O PORT ADDRESS BY UTILIZING A SPECIFIC BIT LINE OF A COMMON BUS

[75] Inventors: Takatoshi Ishii; Syuko Takahashi, both of Tokyo, Japan

[73] Assignee: Tokyo Shibaura Denki Kabushiki Kaisha, Kawasaki, Japan

[21] Appl. No.: 47,565

[22] Filed: Apr. 22, 1987

Related U.S. Application Data

[63] Continuation of Ser. No. 858,895, Apr. 25, 1986, abandoned, which is a continuation of Ser. No. 554,714, Nov. 23, 1983, abandoned.

[30] Foreign Application Priority Data

Nov. 29, 1982 [JP] Japan .................. 57-207688

[51] Int. Cl.⁴ .................. G06F 13/36; G06F 13/14; G06F 13/40
[52] U.S. Cl. .................. 364/900; 364/200
[58] Field of Search ... 364/200 MS File, 900 MS File

[56] References Cited

U.S. PATENT DOCUMENTS

| | | |
|---|---|---|
| 3,715,725 | 2/1973 | Kievit et al. |
| 3,719,930 | 3/1973 | Horoshima ............ 364/200 |
| 3,815,099 | 6/1974 | Cohen et al. ............ 364/200 |
| 3,833,930 | 9/1974 | Macker .................. 364/200 |
| 3,905,025 | 9/1975 | Davis et al. ............ 364/200 |
| 4,004,279 | 1/1977 | Nezu ...................... 364/200 |
| 4,038,642 | 7/1977 | Bouknecht et al. ...... 364/200 |
| 4,040,028 | 8/1977 | Pauker et al. .......... 364/200 |
| 4,048,673 | 11/1977 | Hendrie et al. ........ 364/200 |
| 4,086,627 | 4/1978 | Bennett et al. |
| 4,246,637 | 1/1981 | Brown et al. .......... 364/200 |
| 4,271,466 | 6/1981 | Yamamoto et al. ...... 364/200 |
| 4,271,468 | 6/1981 | Christensen et al. .... 364/200 |
| 4,360,870 | 11/1982 | McVey .................. 364/200 |
| 4,435,763 | 3/1984 | Bellay et al. .......... 364/200 |
| 4,484,263 | 11/1984 | Olson et al. ............ 364/200 |
| 4,484,303 | 11/1984 | Provanzano et al. ..... 364/900 |
| 4,519,034 | 5/1985 | Smith et al. ............ 364/200 |
| 4,598,360 | 7/1986 | Loskorn ................. 364/200 |
| 4,730,251 | 3/1988 | Aakre et al. ............ 364/200 |

FOREIGN PATENT DOCUMENTS 0037875 10/1981 European Pat. Off. .

OTHER PUBLICATIONS

Article from Electronic Design 15, Jul. 19, 1977, pp. 103–106, entitled "Locate Interrupts for μP Peripherals Quickly Without the Need for Polling".
Article from EDN Feb. 4, 1981, p. 88, entitled "Interrogation Tells μP which Boards are Present".

Primary Examiner—Archie E. Williams, Jr.
Assistant Examiner—Danh Phung
Attorney, Agent, or Firm—Cushman, Darby & Cushman

[57] ABSTRACT

An interface circuit can assign a common input/output port address to a plurality of I/O circuits. Each common I/O port is defined in terms of pages. In an actual data input/output, a specific port address is used for port control so as to select one common page. The interface circuit has a first decoder for decoding a specific port address signal. The interface circuit also had a data setter for setting data supplied from a specific bit line of the data bus. The data is set in the data setter in accordance with the decoded signal from the first decoder. Each of the plurality of I/O circuits has a second decoder for decoding the common I/O port address signal. An output from the setter enables a corresponding one of second decoders. As a result, a specific page is selected. When an interrupt request signal is supplied from any one of the I/O circuits, NAND gates generate a specific bit signal for a specific bit line of the data bus in response to the decoded signal from the first decoder so as to allow the system to determine which page is generating the interrupt request signal. The system checks the bit position of the data origin, thereby detecting the page which has supplied the interrupt request signal to the system.

3 Claims, 4 Drawing Sheets

| BIT | 7 | 6 | 5 | 4 | 3 | 2 | 1 | 0 |
|---|---|---|---|---|---|---|---|---|
| STID PORT (DEH) | SET P7 | SET P6 | SET P5 | SET P4 | SET P3 | SET P2 | SET P1 | SET P0 |

FIG. 3B

| BIT | 7 | 6 | 5 | 4 | 3 | 2 | 1 | 0 |
|---|---|---|---|---|---|---|---|---|
| RDID PORT (DFH) | READ P7 | READ P6 | READ P5 | READ P4 | READ P3 | READ P2 | READ P1 | READ P0 |

FIG. 3C

| BIT | 7 | 6 | 5 | 4 | 3 | 2 | 1 | 0 |
|---|---|---|---|---|---|---|---|---|
| PGSL PORT (DDH) | SEL P7 | SEL P6 | SEL P5 | SEL P4 | SEL P3 | SEL P2 | SEL P1 | SEL P0 |

FIG. 4A

| BIT | 7 | 6 | 5 | 4 | 3 | 2 | 1 | 0 |
|---|---|---|---|---|---|---|---|---|
| EXT PORT IN (DFH) | 1 | READ P6 | READ P5 | READ P4 | READ P3 | READ P2 | READ P1 | READ P0 |

FIG. 4B

| BIT | 7 | 6 | 5 | 4 | 3 | 2 | 1 | 0 |
|---|---|---|---|---|---|---|---|---|
| EXT PORT OUT (DFH) | SET ID | SET P6 | SET P5 | SET P4 | SET P3 | SET P2 | SET P1 | SET P0 |

FIG. 5

DATA PROCESSING SYSTEM HAVING INTERFACING CIRCUITS ASSIGNED TO A COMMON I/O PORT ADDRESS BY UTILIZING A SPECIFIC BIT LINE OF A COMMON BUS

This is a continuation of application Ser. No. 858,895, filed Apr. 25, 1986, now abandoned, which was a continuation of Ser. No. 554,714, filed on Nov. 23, 1983, now abandoned.

BACKGROUND OF THE INVENTION

The present invention relates to an interface circuit arranged between an input/output (to be referred to as an I/O hereinafter) circuit and a system bus and, more particularly, to an interface circuit for assigning a common I/O port address to a plurality of I/O circuits.

An expansion interface other than an internal interface is arranged in a system having a microcomputer. Various I/O devices (e.g., a process I/O device and an expansion external memory) are arranged in an expansion unit.

In general, when a microcomputer controls such optional I/O expansion devices, a specific I/O of a specific circuit (e.g., data register and status register) must be accessed from the computer side. For this purpose, the I/Os are assigned to corresponding main memory locations. Alternatively, the I/Os are assigned to corresponding I/O ports. According to the former technique, a specific I/O is connected to an address bus of the microcomputer, and the microcomputer supplies specific address data and a memory write/read signal (MEM R/W) to the I/O side. The I/O side decodes the address data and supplies the decoded signal and the MEM R/W signal to a specific internal circuit. As a result, the microcomputer can exchange data with the specific internal circuit on the I/O side. However, this technique has a disadvantage in that the main memory area is occupied to a degree corresponding to the number of I/Os. Recently, the capacity of such microcomputers has been increased and the area for the address locations has been increased. However, the capacity of programs such as an operating system (OS) and word processing control programs has also tended to increase. Therefore, when a large user area is assumed, I/O allocation with respect to the address locations is limited, resulting in inconvenience.

A technique for assigning I/Os to corresponding I/O ports has been proposed to solve the above problem. According to this technique, an I/O is connected to part (e.g., the lower 8 bits of a 16-bit address bus) of the address bus. In this case, the microcomputer generates an I/O port address and an I/O signal (I/O IN/OUT). The I/O decodes the I/O port address and supplies the decoded signal and the I/O IN/OUT signal to a specific internal circuit. Then, the microcomputer can exchange data with the internal circuit in the I/O. In this case, the address locations of the I/O are independent of the main memory area.

In microcomputer systems, the processing capacity in a variety of applications is increasing. Along with this, the number of I/O devices is increasing. System designers and manufacturers are introducing systems having a minimum number of required I/Os. These systems then offer options for expanding the number of I/Os as required for a variety of applications, through an expansion interface.

In order to control these options (generally, expansion boards) by the microcomputer, specific I/O port address must be assigned to the optional boards. However, the number of I/O port addresses of the microprocessor is limited, so that the I/O ports to be assigned run out, and a common I/O port must be assigned to different I/O options. When different I/O options have a common I/O port address, the user cannot use these I/O options together.

In addition to this disadvantage, an interrupt request line between an I/O option and the microprocessor is required for connection of this optional I/O. An ID status is required to cause the control program to determine which I/O sends an interrupt request. Therefore, in order to expand the I/O architecture, the interrupt request line and the ID status are also preferably expandable.

Microcomputer controlled systems (in particular, personal computers) tend to be mutually compatible (software and I/O devices are commonly used between different systems). Therefore, compatibility of the optional I/Os becomes the significant problem to be solved.

SUMMARY OF THE INVENTION

It is an object of the present invention to provide an interface circuit for assigning a limited number of I/O port addresses to any number of I/O devices.

It is another object of the present invention to provide an interface circuit for expanding I/Os on a bus having a common specification between different processors so as to provide an optional I/O compatibility with another I/O of higher or lower level.

In order to achieve the above objects of the present invention, there is provided an interface circuit arranged between each of a plurality of input/output circuits to which a common input/output port address is assigned, and a system bus consisting of an interrupt request signal line, an input/output port address bus, a control signal line and a data bus.

The interface circuit includes a device for sending onto the interrupt request signal line an interrupt request signal generated from a specific input/output circuit of the plurality of input/output circuits;

A first decoding device for decoding a specific port address sent onto the input/output port address bus;

a specific bit data latch device for latching specific bit data on the data bus in response to a decoded signal from the first decoding device;

a second decoding device, enabled in response to an output signal from the specific bit data latch device, for decoding the common input/output port address and for supplying the decoded signal to the specific input/output circuit; and a device for generating data indicating an interrupt request status of the specific input/output circuit to a specific bit of the data bus in response to the decoded signal from the first decoding means when the specific input/output circuit generates the interrupt request signal.

DETAILED DESCRIPTION OF THE PREFERRED EMBODIMENTS

Figure 1:
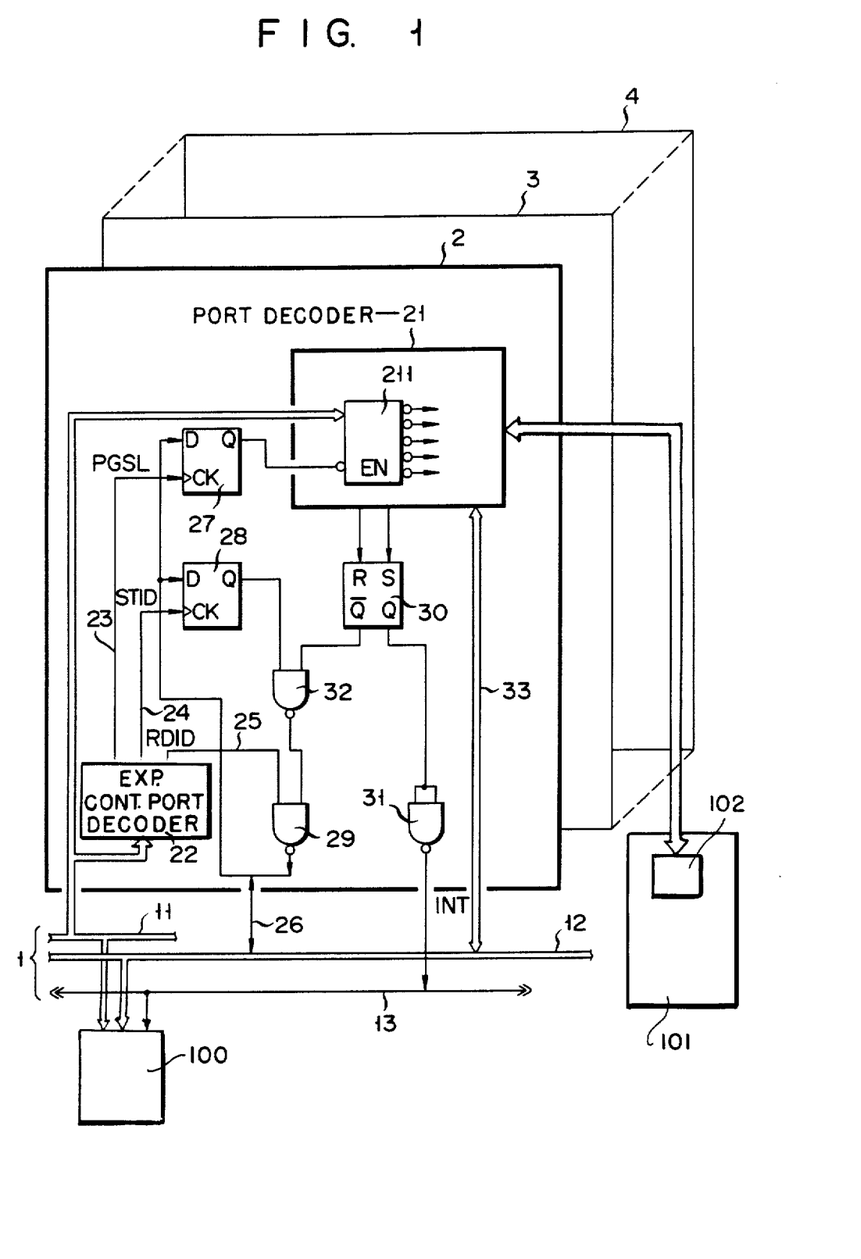
FIG. 1 is a circuit diagram of an interface circuit according to an embodiment of the present invention.

Referring to FIG. 1, a microcomputer 100 is connected to a system bus 1. The system bus 1 includes an I/O port address bus 11, a data bus 12 and an interrupt request signal line 13. The system bus 1 also includes control signal lines (I/O IN/OUT signal lines, etc.; not shown) connected to a microcomputer. Reference numerals 2 to 4 denote interface boards, respectively. Identical interface circuits as in the interface circuit of the board 2 are arranged on the interface boards 3 and 4, respectively. An I/O device 101, connected to an I/O circuit 21, includes an I/O circuit 102. The circuit 21 controls I/O devices. Various types of arrangement can be considered for the I/O circuit 21 in accordance with the types of I/O devices. The I/O circuit 21 is not directly related to the scope of the present invention, and a detailed description thereof will therefore be omitted. A common port decoder 211 serves to specify the individual I/O ports within the I/O circuit 21. Identical I/O circuits are arranged on the boards 3 and 4. The main feature of the present invention is that I/O ports (called common ports) assigned to these circuits overlap each other throughout the boards 2 to 4. This arrangement will be described with reference to FIG. 2 later. An expansion control port decoder 22 is used to decode signals for PGSL, STID and RDID ports to be described below. Ports PGSL, STID, and RDID are the expansion control ports for page selection and the details thereof will be described later. A decoded signal (PGSL) sent out through a PGSL signal line 23 is used to select one of the I/O circuits (e.g., the I/O circuit 21) arranged on the boards 2 to 4 to which the common I/O port addresses are assigned.

A decoded signal (STID) sent out through an STID signal line 24 is used to check whether or not the I/O circuit 21 is connected to the microcomputer (not shown) and then to which corresponding page of the common port it is connected.

A decoded signal (RDID) sent out through an RDID signal line 25 is used to discriminate which page of the common port supplies the interrupt request to the microcomputer. A data signal line 26 is connected to a signal line of the first bit of the data bus 12 so as to supply the first bit data of the data on the data bus 12 to flip-flops (DFFs) 27 and 28 and send out an output signal from a NAND gate 29 onto the first bit signal line. Which bit signal line of the data bus 12 is used is determined by which page of the common port is connected to the board 2. The DFF 27 is clocked in response to the PGSL signal so as to set the data on the data signal line 26. The DFF 28 is triggered by the STID signal so as to set the data on the data signal line 26. When a Q output from the DFF 27 is set at logic "0", the decoder 211 is enabled. The enabled decoder 211 generates a decoded signal when a predetermined port address of the common port is received through the I/O port address bus 11. An R-S flip-flop serves as an interrupt request flip-flop (INT FF) 30. The INT FF 30 is set under the control (not shown) of the I/O circuit 21 when the I/O device connected to the board 2 requests data transmission to the microcomputer. A Q output from the INT FF 30 is supplied as the interrupt request signal (INT) with respect to the microcomputer onto the interrupt request signal line 13 through a NAND gate 31. A $\bar{Q}$ output from the INT FF 30 is supplied to a first bit line of the data bus 12 through a NAND gate 32, the NAND gate 29 and the data signal line 26 when the DFF 28 is held in the set status (i.e., the Q output thereof is set at logic "1") and the decoder 22 generates the RDID signal. Reference numeral 33 denotes a data signal transmission line between the I/O circuit 21 and the data bus 12.

Figure 2:
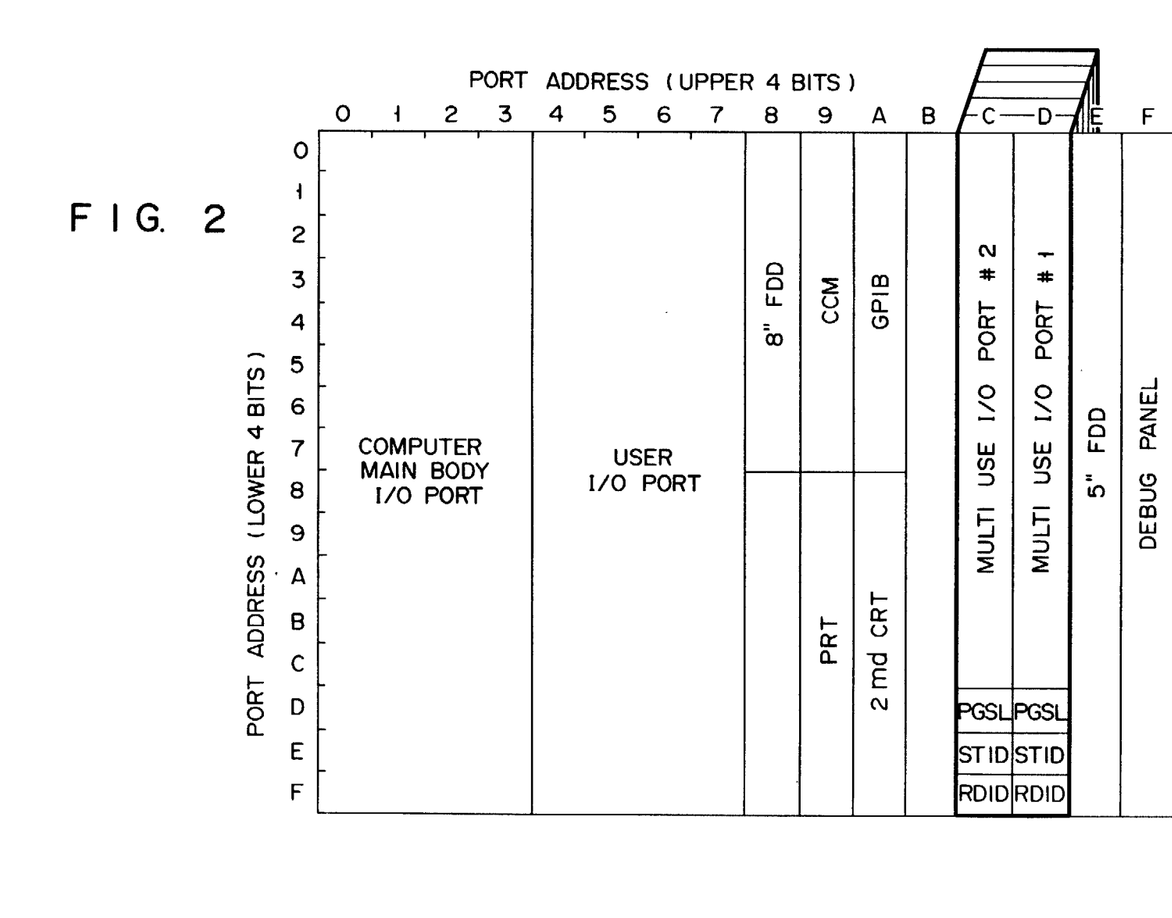
FIG. 2 is an I/O port map of a microcomputer application system used in the circuit shown in FIG. 1.

FIG. 2 shows an I/O port map of a microcomputer application system for the interface circuit according to the above embodiment. Each I/O port is accessed by an 8-bit I/O port address. In the port map shown in FIG. 2, the upper 4 bits of the I/O port address are plotted along the abscissa axis, and the lower 4 bits thereof are plotted along the ordinate axis. The upper and lower 4 bits are designated by hexadecimal notation. As shown in FIG. 2, port addresses 00H (H indicates hexadecimal notation) to 3FH are assigned to a computer main body I/O port; and port addresses 40H to 7FH are reserved as a user I/O port (e.g., port used for connecting a device designed by the user).

Port addresses 80H to FFH are assigned to a manufacturer's expansion port. A portion (port addresses C0H to CFH and port addresses D0H to DFH) of the manufacturer's expansion port which is surrounded by a thick line is the main feature (common ports or MULTI USE I/O PORTS #1 and #2) of the present invention. As shown in FIG. 2, a plurality of pages can be set in each of the common ports #1 and #2. A page selection means is required to allow the microcomputer to control and designate one of the pages commonly assigned to the common ports. The expansion control ports for page selection are PGSL, STID, RDID ports mentioned above. The address DDH is assigned to the PGSL port as the common port #1; and the address CDH is assigned to the same port as the common port #2. Similarly, the STID and RDID as common ports #1 are assigned the addresses DEH and DFH, and as common ports #2, the addresses CEH and CFH, respectively.

Assume that the boards 2 to 4 are commonly assigned the common port addresses D0H to DFH. The operation of the interface circuit of the present invention will now be described.

(i) Common Port Allocation from Viewpoint of Microcomputer

Figure 3A:
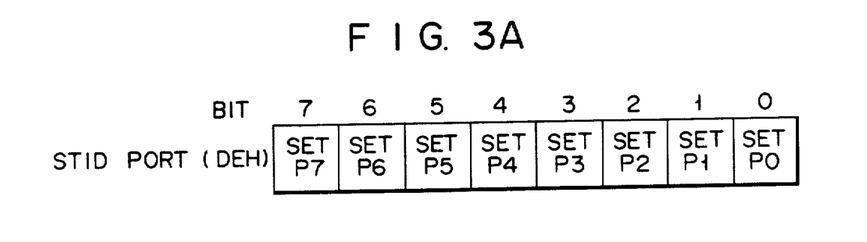
FIG. 3A shows a data definition of data generated by a microcomputer when it checks how boards are connected to common I/O ports.

The microcomputer must check how the boards are connected to the common I/O ports when the system is energized. This is performed by the initialization routine programmed in the microcomputer. The STID signal in FIG. 1 is generated from the decoder 22 when the port address DEH signal is generated from the microcomputer. The data for executing an output command (e.g., OUT 0DEH, XXH . . . XXH in the Z80 by Zilog (U.S.A.) where XXH . . . XXH is data) with respect to the I/O port address DEH is defined as shown in FIG. 3A. The board 2 in FIG. 1 is assigned the 0th page, and the data signal line 26 is connected to the 0th bit line of the data bus 12. The data bus 12 is active low (the data appears on the bus 12 when the bus is set at logic "0"). All the bit lines of the data bus 12 are normally set at logic "1". Assume that the RDID signal is generated from the decoder 22, when the port address DFH signal is generated from the microcomputer. This assumption is applied to the following description.

In the initialization routine, assume whether or not the 0th page I/O board of the common port is mounted is checked. The microcomputer generates a command (OUT 0DEH, 0FEH) for generating the FEH data (only the 0th bit of the data bus 12 is set at logic "0") to the port address DEH. Then, the DEF and FEH data are supplied to the I/O port address bus 11 and the data bus 12, respectively. The decoder 22 decodes the port address DEH data and generates an STID signal. The STID signal is supplied to the clock input terminal of the DFF 28. In this case, the D input terminal of the DFF 28 receives the data of logic "0" (the 0th bit line of the data bus 12 is set at logic "0"), so that the Q output from the DFF 28 is set at logic "0". Therefore, the NAND gate 32 generates an output of logic "1".

Figure 3B:
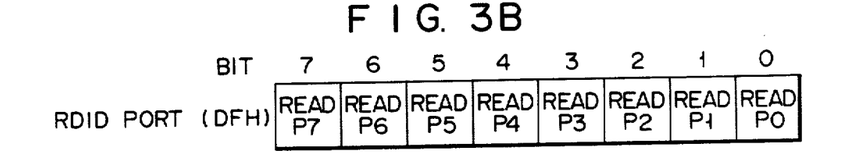
FIG. 3B shows a data definition of data read by the microcomputer when it checks how boards are connected to common I/O ports or which of the boards generates an interrupt request signal.

The microcomputer then executes an operation (IN 0DFH) for receiving data from the port address DFH. The DFH data is sent onto the I/O port address bus 11. The decoder 22 decodes the port address DFH data and generates an RDID signal. In response to the RDID signal, the NAND gate 29 is enabled, so that the output (logic "1") from the NAND gate 32 is inverted. A signal of logic "0" is thus supplied from the gate 32 onto the 0th bit line of the data bus 12. In this case, the DFFs 28 of the other boards 3 and 4 are not set at logic "0" by the previous command (OUT 0DEH, 0FEH). Therefore, even if the boards are assigned other pages, the bit lines of the data bus 12 which correspond to these pages will not change their logic state. The data supplied to the microcomputer in response to the input command (IN 0DFH) comprises bits wherein only the LSB is set at logic "0", and other bits are set at logic "1". As shown in FIG. 3B, the bits of the data at the RDID port correspond to those of the data (FIG. 3A) at the STID port. When the microcomputer detects that the bit corresponding to the specific page is set at logic "0", the microcomputer can determine that the board is assigned the specific page. In the above description, the signal of logic "0" is set in the bit (0th bit) corresponding to the 0th page by detecting the 0th slot. Therefore, the microcomputer detects that the board 2 is assigned to the 0th page. Otherwise, the 0th bit data will not change. Finally, the microcomputer executes an output command (OUT 0DEH, 0FFH) for generating the FFH data to the port address DEH so as to set the DFF 28 to logic "1" (normal state), thereby completing a given sequence.

In the above description, only one page is detected. However, when data is entered from the RDID port by setting the DDFs 28 of all the boards at logic "0", the microcomputer can detect the mounting state of all the boards assigned the port address DXH.

In order to detect the expansion I/O configuration in addition to the system initialization, the microcomputer checks the presence of the expansion I/Os in the same manner as described above.

(ii) Interrupt Request Processing

The microcomputer operation will be described when an interrupt request signal is supplied from the I/O circuit 21 to the microcomputer.

When the INT FF 30 is set, the I/O circuit 21 supplies the interrupt request signal to the microcomputer. A Q output from the INT FF 30 is set at logic "1" and is inverted by the NAND gate 31. As a result, a signal of logic "0" is transmitted onto the signal line 13. When the microcomputer determines that the interrupt request signal is generated from the common port DXH, the following operation is performed.

The microcomputer executes an input command (IN 0DFH) which causes the micrcomputer to receive data from the port address DFH. The port address DFH is sent out onto the I/O port address bus 11. This signal is decoded by the decoder 22, so that the decoder 22 generates an RDID signal. In this case, the Q output from the DFF 28 is set at logic "1" (normal state). The $\bar{Q}$ output from the INT FF 30 is set as the interrupt state at logic "0". When the RDID signal is supplied to the NAND gate 29, the output of logic "0" appears on the 0th bit line of the data bus 12 through the data signal line 26. The bits of the data from the boards 3 and 4 are set at logic "1", so that the microcomputer receives from the data bus 12 the data only the 0th bit of which is set at logic "0". According to the definition of the RDID port as shown in FIG. 3B, when the 0th bit is set at logic "0", an interrupt request signal is supplied from the 0th page of the common port. Therefore, the system can detect only the page which requests the interrupt operation and which is assigned to the common ports (DXH) in accordance with the fetched data, thereby performing the interrupt operation.

(iii) Input/Output Operation between Microcomputer and I/O Device

A data input/output between the microcomputer and a specific I/O device (e.g., I/O circuit 21) connected to the common ports will be described when the system is initialized upon energization of the system, when the I/O device is started by the microcomputer, or after the interrupt operation is completed.

Figure 3C:
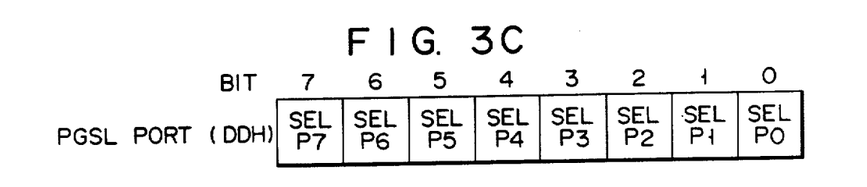
FIG. 3C shows a data definition of data generated by the microcomputer when it selects one of the boards connected to the common I/O ports for data input/output operation with the selected board in a first embodiment.

The microcomputer executes a data output command for specifying a specific slot of the PGSL port address DDH. The data at the PGSL port address DDH is defined as shown in FIG. 3C. In order to specify the board 2, only the LSB of the data must be set at logic "0" since the data signal line 26 is coupled to the 0th bit line. In other words, the FEH data is supplied to the port address DDH (execution of OUT 0DDH, 0FEH). As a result, the port address DDH is supplied onto the I/O port address bus 11. This signal is decoded by the decoder 22. The decoder then generates a PGSL signal. The PGSL signal is supplied to the clock input terminal (CK) of the DFF 27. In this case, the signal of logic "0" is supplied from the 0th bit line of the data bus 12 to the D input terminal of the DFF 27, so that the Q output terminal of the DFF 27 goes to logic "0". The decoder 211 becomes thus active. Thereafter, when the microcomputer performs an input/output command for specifying the port addresses D0H to DCH, an output from only the I/O circuit 21 (whose decoder 211 is active) among the I/O circuits commonly assigned to the common ports is decoded. Therefore, data can be exchanged between the microcomputer and the corresponding I/O circuit 21 through the data signal transmission line 33.

As has been apparent from the above description with reference to operations (i), (ii) and (iii), even if a plurality of I/O boards are assigned the same I/O port, the microcomputer can select one of the boards and can exchange data with this board. Furthermore, in this embodiment, the bits corresponding to pages are commonly defined by means of the RDID, STID, and PGSL ports. The D inputs to the DFFs 27 and 28 and the output from the NAND gate 29 are commonly connected to the same bit line of the data bus 12. This configuration is very convenient for microcomputer operation with respect to each page. However, these bits can be defined with respect to different ports.

In the above embodiment, page expansion is restricted by the width of the data bus. However, a plurality of sets of RDID, STID and PGSL ports are arranged in the DXH or CXH areas, so that the pages can be arbitrarily expandable.

Figure 4A:
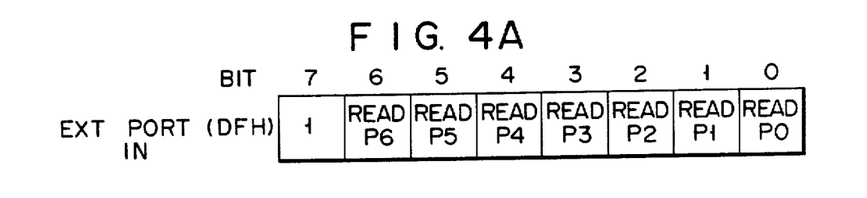
FIG. 4A shows a data definition of data read by the microcomputer when it checks how boards are connected to common I/O ports or which of the board generates an interrupt request signal.
Figure 4B:
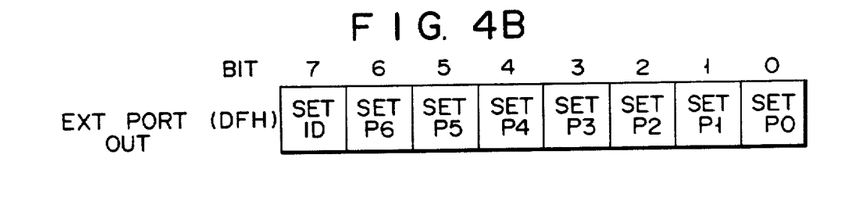
FIG. 4B shows a data definition of data generated by the microcomputer when it checks how boards are connected to common I/O ports or when it selects one of the boards connected to the common I/O ports for data input/output operation with the selected board in a second embodiment.
Figure 5:
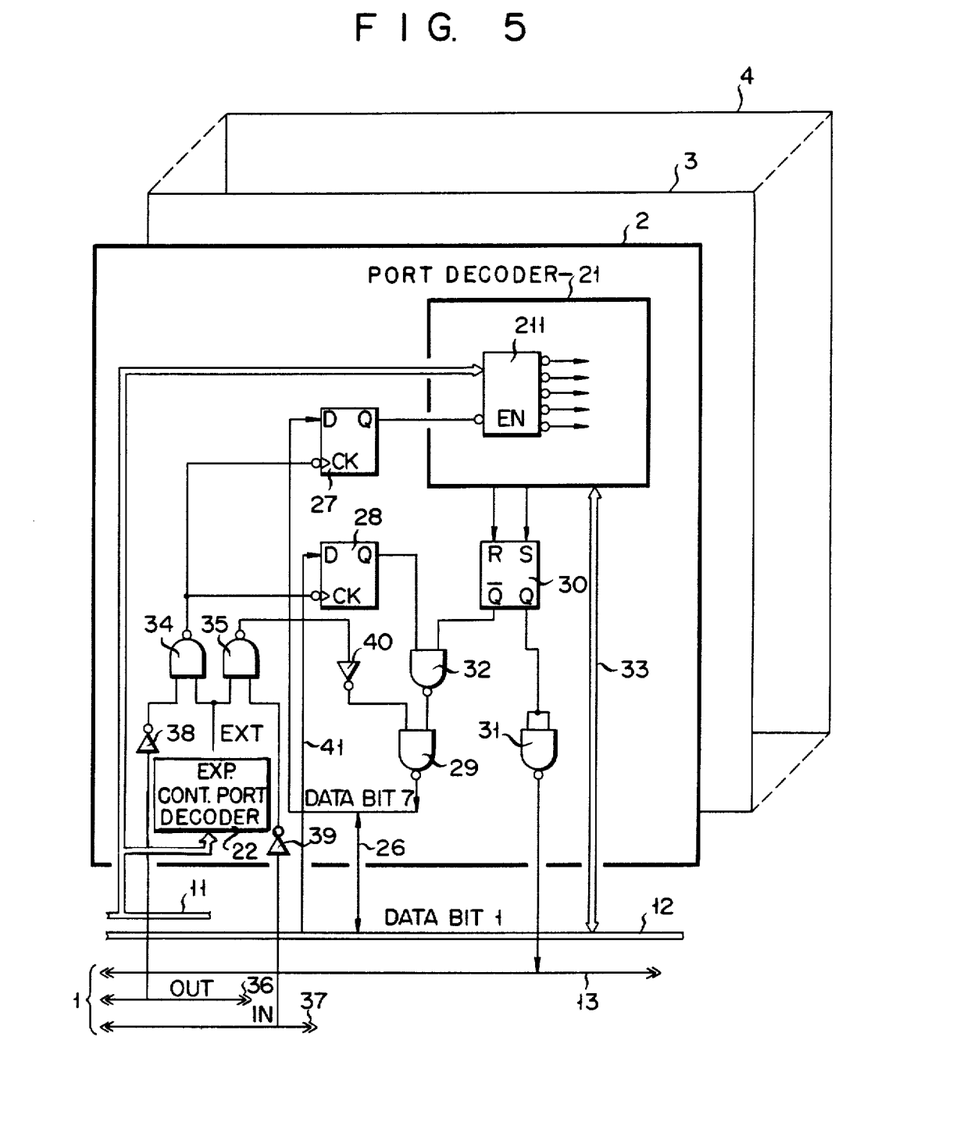
FIG. 5 is a circuit diagram of an interface circuit according to the second embodiment of the present invention.

In the above embodiment, three ports are occupied as the expansion control I/O ports (STID, RDID and PGSL ports) for each common port. However, the STID port data only requires one bit, the RDID port is used only for data input, and the PGSL port is used only for data output. Expansion control can therefore be performed by only one port (to be called an expansion port). FIGS. 4A and 4B show definitions of data at the expansion port. The expansion port is assigned the I/O port address DFH. FIG. 5 shows an expansion interface circuit in accordance with these definitions. The same reference numerals as used in FIG. 1 denote the same parts in FIG. 5, and a detailed description thereof will be omitted. In this embodiment, a decoder 22 decodes a port address DFH signal and generates an EXT signal. The EXT signal is supplied to NAND gates 34 and 35. Reference numeral 36 denotes an I/O OUT signal ($\overline{OUT}$) line; 37, an I/O IN signal ($\overline{IN}$) line.

When the microcomputer executes a data output command (OUT) for causing the microcomputer to generate data to the I/O port, a signal ($\overline{OUT}$ signal) of logic "0" appears on the signal line 36. When the microcomputer executes a data input command (IN) for causing the microcomputer to fetch data from the I/O port, a signal ($\overline{IN}$ signal) of logic "0" appears on the signal line 37. The $\overline{OUT}$ signal is inverted by a NOT gate 38, and an inverted signal is supplied to the NAND gate 34. The $\overline{IN}$ signal is inverted by a NOT gate 39 and is supplied to the NAND gate 35. Therefore, when the microcomputer executes the data output command (OUT 0DFH, XXH) to access the I/O port address DFH, the NAND gate 34 generates an output. However, when the microcomputer performs the data input command (IN 0DFH) to access the I/O port address DFH, the NAND gate 35 generates an output. The output from the NAND gate 34 is supplied to the clock input terminals (CK) of DFFs 27 and 28, respectively. The output from the NAND gate 35 is inverted by a NOT gate 40 and is supplied to a NAND gate 29. A data signal line 41 is connected to the 7th bit line of the data bus 12 and supplies the 7th bit data to the D input terminal of the DFF 28. The signal lines 41 of the boards 3 and 4 are connected to the 7th bit lines of the data buses 12 thereof, respectively.

The operation of the interface circuit of the above embodiment will be described hereinafter.

(i) Common Port Allocation from Viewpoint of Microcomputer

The microcomputer executes an output command (OUT 0DFH, 8FH) for supplying data (i.e., 8FH) only the MSB (7th bit) of which is set at logic "0" to the address port DFH. The signal is generated from the NAND gate 34. In this case, the data of logic "0" is supplied to the D input terminal of the DFF 28 through the signal line 41, so that the Q output thereof is set at logic "0". The DFFs 28 of the boards 2 to 4 are simultaneously set therethrough. The signal (whereof all the bits except for the bit 7 are set at logic "1") is supplied from the NAND gate 34 to the CK terminal of the DFF 27, so that the logic state of the output terminal of the DFF 27 is not changed.

The microcomputer then executes the data input command (IN 0DFH) for receiving data from the address DFH port. The signal is generated from the NAND gate 35. This signal is inverted by the NOT gate 40 and is supplied to the NAND gate 29. The NAND gate 29 is then enabled. In the same manner as in the first embodiment, when the DFF 28 is set at logic "0", an output from the NAND gate 32 is set at logic "1". When the NAND gate 29 is enabled, the signal of logic "0" is supplied onto the 0th bit line of the data bus 12. The above operation is simultaneously performed throughout the boards 2 to 4. Therefore, data appears on the data bus 12 such that a bit corresponding to the page is set at logic "0". This data is fetched in the microcomputer. The microcomputer checks the bit position of the signal of logic "0", so that the microcomputer can detect the page used in the common port (DXH). Finally, the microcomputer executes an output command (OUT 0DFH, 0FFH) for generating the FFH data to the port address DFH. As a result, the DFF 28 is set at logic "1" (normal state).

(ii) Interrupt Request Processing

The microcomputer executes a data input command (IN 0DFH) receiving data from the port address DFH. The NAND gate 29 is disabled in the same manner as in operation (i). In this case, when the INT FF 30 is set, an output from the NAND gate 29 is set at logic "0". When the microcomputer detects the signal bit which is set at logic "0", it detects the page which supplies the interrupt request signal thereto.

(iii) Input/Output Operation between Microcomputer and I/O Device

The microcomputer supplies to the port address DFH data setting a signal of logic "0" in the bit corresponding to the page. However, in this embodiment, the bit 7 is used as the SET ID bit and must be set at logic "1". As a result, the signal is generated from the NAND gate 34, and the DFF 27 corresponding to the selected page is set at logic "0".

The subsequent operation is the same as that of the first embodiment.

In the second embodiment, since one of the bits is used as the SET ID bit, the common port can only be expanded to seven pages. However, the control port conveniently consists of one port.

The relationship between the page and the bit position in the first and second embodiment can be determined in accordance with the mounting positions of the boards. In other words, the above relationship can be determined by the bit line of the data bus 12 which is connected to the data signal line 26. Alternatively, the relationship can be determined in accordance with the type of I/O device connected to the board 2. For example, the board 2 may be designed such that the data signal line 26 is coupled to the bit 0 when an 8FDD board is used, while the data signal line 26 is coupled to the bit 1 when an RS232C interface board is used. According to this scheme, when an interrupt request signal is supplied from the I/O device to the microcomputer, the type of I/O device can be specified in accordance with the bit position of data which is read from the common control I/O port. Therefore, the subsequent software operation can be simplified.

What is claimed is:

1. A data processing system comprising:
    a plurality of input/output devices for entering data into the system and performing predetermined functions according to data output from the system, each of said input/output devices including input/output circuits for receiving data assigned thereto and sending data generated therein;
    a data processing unit for controllng said input/output devices, said data processing unit generating data to be transmitted to the input/output devices and handling data transmitted from the input/output devices;
    said data processing unit generates a first specific address data when it tries to confirm said input/output circuit generating an interrupt request signal in response to a received interrupt request signal and sends the first specific address data to all of said interface circuits for said input/output circuits assigned to an input/output port address;
    said input/output circuits generating the interrupt request signal for requesting data transmission to said data processing unit respectively;
    a plurality of interface circuits each for different ones of said input/output devices provided for assigning said input/output circuits therein to the input/output port address, whereby a plurality of input/output circuits, each of which is in a different input/output device, are assigned to a common input/output port address of said data processing unit;
    a data bus connected to said data processing unit and said input/output circuits in said input/output devices for transmitting data therebetween;
    an interrupt request signal line connected to said data processing unit and said plurality of interface circuits for transmitting the interrupt request signals generated by said input/output circuits which are assigned to the common input/output port;
    said plurality of interface circuits connecting each of said input/output devices to the data bus and the interrupt request signal line, respectively; and
    each of said plurality of interface circuits including;
    (a) means, connected to said interrupt request signal line, for sending onto said interrupt request signal line said interrupt request signal generated from one of said input/output circuits in said input/output devices connected thereto;
    (b) means, connected to said data bus, for sending onto a specific bit position of said data bus one bit data to be read by said data processing unit as an interrupt request status representing which of said input/output circuits assigned to the common input/output port address generates the interrupt request signal, other bits of which represent different interface circuits respectively whereby said data processing unit confirms which input/output circuit assigned to the common input/output port address is generating the interrupt request signal by examining value of each bit of the interrupt request status read from the data bus, said one bit data sending means of each said interface circuit includes first decoding means for decoding the first specific address data and generating a first decoded signal and said one bit data sending means sends onto the specific bit position of the data bus said one bit data in response to the first decoded signal when the interface circuit connected thereto generates the interrupt request signal, and
    (c) means, connected between said data processing unit and said input/output circuits, for permitting the input/output circuits connected thereto to be accessed with said address data generated by said data processing unit according to data transmitted from said data processing unit, each bit of which is assigned to a different interface circuit and represents permission of data transmission between said data processing unit and said input/output circuit connected to the corresponding interface circuit, whereby said data processing unit performs input/output operations with a selected one of the input/output circuits assigned to the common input/output port address.

2. A data processing system according to claim 1, wherein said data processing unit generates a second specific address data and a selecting data, one bit of the selecting data represents permission of data transmission for said interface circuit corresponding to said one bit sent by said one bit data sending means, said permitting means of each said interface circuit includes second decoding means for decoding said second specific address data and generating a second decoded signal and means for generating a permission signal according to the second decoded signal and the corresponding bit of the selecting data sent from said data processing unit, and said input/output circuit includes a third decoding means for decoding the common input/output port address sent from said data processing unit in response to the permission signal and generating a third decoded signal for enabling data from said data processing unit to be received therein or enabling data to be sent to said data processing unit therefrom.

3. A data processing system comprising:
    a plurality of input/output devices for entering data into the system and performing predetermined functions according to data output from the system, each of said input/output devices including input/output circuits for receiving data assigned thereto and sending data generated therein;
    a data processing unit for controlling said input/output devices, said data processing unit generating data to be transmitted to the input/output devices and handling data transmitted from the input/output devices;
    said data processing unit generates address data representing an input/output port address of said data processing unit provided to receive data from one of said input/output circuits assigned to the input/output port address and to send data thereto;
    said input/output circuits each generating an interrupt request signal for requesting data transmission to said data processing unit;

a plurality of interface circuits each for different ones of said input/output devices provided for assigning said input/output circuits therein to the input/output port address, whereby a plurality of input/output circuits, each of which is in a different input/output device, are assigned to a common input/output port address of said data processing unit;

a data bus connected to said data processing unit and said input/output circuits in said input/output devices for transmission data therebetween;

an interrupt request signal line connected to said data processing unit and said plurality of interface circuits for transmitting the interrupt request signals generated by said input/output circuits which are assigned to the common input/output port;

each of said plurality of interface circuits including;

(a) means, connected to said interrupt request signal line, for sending onto said interrupt request signal line said interrupt request signal generated from one of said input/output circuits in said input/output devices connected thereto;

(b) means, connected to said data bus, for sending onto a specific bit position of said data bus one bit data to be read by said data processing unit as an interrupt request status representing which of said input/output circuits assigned to the common input/output port address generates the interrupt request signal, other bits of which represent different interface circuits respectively whereby said data processing unit confirms which input/output circuit assigned to the common input/output port address is generating the interrupt request signal by examining value of each bit of the interrupt request status read from the data bus, and (c) means, connected between said data processing unit and said input/output circuits, for permitting the input/output circuits connected thereto to be accessed with said address data generated by said data processing unit according to data transmitted from said data processing unit, each bit of which is assigned to a different interface circuit and represents permission of data transmission between said data processing unit and said input/output circuit connected to the corresponding interface circuit, whereby said data processing unit performs input/output operations with a selected one of the input/output circuits assigned to the common input/output port address; and control signal lines for transmitting a data-in control signal for determining a data input operation of said data processing unit and a data-out control signal for determining a data output operation thereof, wherein said data processing unit generates the data-in control signal and a specific address data when it tries to confirm said input/output circuit generating an interrupt request signal in response to the interrupt request signal received, and sends them to all of said interface circuits for said input/output circuits assigned to the input/output port, and generates the data-out control signal, the specific address data and a selecting data, one bit of the selecting data representing permission of data transmission for said interface circuit corresponding to the one bit data sent by the one bit data sending means when said data processing unit performs an input/output operation with the selected one of the input/output circuits, said one bit data sending means for decoding the specific address and generating a first decoded signal in response to the data-in control signal, said one bit data sending means sending onto the specific bit position of the data bus said one bit data in response to the first decoded signal when the interface circuit connected thereto generates the interrupt request signal, said permission means of each said interface circuit includes second decoding means for decoding said specific address data and generating a second decoded signal in response to the data-out control signal and means for generating a permission signal according to the second decoded signal and the corresponding bit of the selecting data sent from said data processing unit, and said input/output circuit includes a third decoding means for decoding the common input/output port address sent from said data processing unit in response to the permission signal and generating a third decoded signal for enabling data from said data processing unit to be received therein or enabling data to be sent to said data processing unit therefrom.

* * * * *